United States Patent
Shen et al.

(10) Patent No.: US 11,323,030 B2
(45) Date of Patent: May 3, 2022

(54) CONTROL METHOD FOR DC/DC CONVERTER AND DC/DC CONVERTER FOR ACHIEVING CONTINUOUS VOLTAGE GAIN

(71) Applicant: Delta Electronics (Shanghai) Co., Ltd., Shanghai (CN)

(72) Inventors: Guoqiao Shen, Shanghai (CN); Jian Li, Shanghai (CN); Guojin Xu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 116 days.

(21) Appl. No.: 16/872,366

(22) Filed: May 12, 2020

(65) Prior Publication Data

US 2020/0366204 A1   Nov. 19, 2020

(30) Foreign Application Priority Data

May 14, 2019 (CN) .......................... 201910396385.0

(51) Int. Cl.
  *H02M 3/158* (2006.01)
  *H02M 1/38* (2007.01)
  *H02M 1/00* (2006.01)

(52) U.S. Cl.
  CPC .......... *H02M 3/1582* (2013.01); *H02M 1/38* (2013.01); *H02M 1/0095* (2021.05)

(58) Field of Classification Search
  CPC .... H02M 1/0095; H02M 3/1582; H02M 3/07; H02M 7/4837; H02M 3/1584; H02M 1/38
  See application file for complete search history.

(56) References Cited

U.S. PATENT DOCUMENTS

| | | | | |
|---|---|---|---|---|
| 7,176,667 B2* | 2/2007 | Chen | .................. | H02M 3/1588 323/282 |
| 7,777,457 B2* | 8/2010 | Haiplik | .............. | H02M 3/1582 323/222 |

(Continued)

FOREIGN PATENT DOCUMENTS

| CN | 102122888 A | 7/2011 |
|---|---|---|
| CN | 103118454 A | 5/2013 |

(Continued)

OTHER PUBLICATIONS

Corresponding China office action dated May 6, 2021.

*Primary Examiner* — Gustavo A Rosario-Benitez
(74) *Attorney, Agent, or Firm* — CKC & Partners Co., LLC

(57) ABSTRACT

A control method for a DC/DC converter and a DC/DC converter are provided. The method includes: detecting an input voltage and an output voltage, and calculating a voltage gain according to a ratio of the output voltage to the input voltage; determining an operating mode of the DC/DC converter according to a first threshold and the voltage gain, and setting a first duty ratio and a second duty ratio according to the mode; detecting an inductor current to generate a current feedback signal, and then setting a regulation component according to the current feedback signal; regulating the first or second duty ratio according to the regulation component and generating driving signals to control the two groups of switches. The converter could operate in the Buck mode, Boost mode and Buck-Boost mode, and the voltage gain could be linearly continuous around 1.

18 Claims, 6 Drawing Sheets

(56) References Cited

U.S. PATENT DOCUMENTS

| | | | | |
|---|---|---|---|---|
| 8,446,133 | B2* | 5/2013 | Kuan | H02M 3/1582 |
| | | | | 323/271 |
| 9,973,083 | B1* | 5/2018 | Rose | H02M 3/157 |
| 10,224,803 | B1* | 3/2019 | Rainer | H02M 1/083 |
| 2006/0221516 | A1* | 10/2006 | Daboussi | H02M 3/1582 |
| | | | | 361/18 |
| 2008/0074090 | A1* | 3/2008 | Darroman | H02M 3/1582 |
| | | | | 323/255 |
| 2008/0219032 | A1* | 9/2008 | Stancu | H02M 3/1582 |
| | | | | 363/21.01 |
| 2012/0134180 | A1 | 5/2012 | Watanabe et al. | |
| 2015/0049516 | A1* | 2/2015 | Yan | H02M 3/3376 |
| | | | | 363/17 |
| 2015/0062971 | A1* | 3/2015 | Ye | H02M 3/33569 |
| | | | | 363/17 |
| 2015/0333635 | A1* | 11/2015 | Yan | H02M 3/3376 |
| | | | | 363/17 |
| 2019/0305675 | A1* | 10/2019 | Chen | H02M 3/158 |
| 2020/0220460 | A1* | 7/2020 | Dharmalinggam | H02M 1/08 |

FOREIGN PATENT DOCUMENTS

| | | |
|---|---|---|
| CN | 103219868 A | 7/2013 |
| CN | 105144557 A | 12/2015 |
| CN | 105337492 A | 2/2016 |
| CN | 106257811 A | 12/2016 |
| CN | 108599537 A | 9/2018 |
| EP | 1998428 A1 | 12/2008 |

* cited by examiner

CONTROL METHOD FOR DC/DC CONVERTER AND DC/DC CONVERTER FOR ACHIEVING CONTINUOUS VOLTAGE GAIN

CROSS-REFERENCE TO RELATED APPLICATION

This application claims priority to Chinese Patent Application No. 201910396385.0, filed on May 14, 2019, which is hereby incorporated by reference in its entirety.

TECHNICAL FIELD

Embodiments of the invention relate to circuit control technologies and, in particular, to a control method for a DC/DC converter and a DC/DC converter.

BACKGROUND

In a battery energy storage system, a bidirectional DC/DC converter is often used to connect DC buses, energy storage elements and DC sources, as well as loads with different voltages, so as to achieve current and power regulation. A non-isolated Buck or Boost bidirectional DC/DC converter enables efficient power conversion with fewest switching elements. However, the voltage of one side of the Buck or Boost DC/DC converter is high and the voltage of the other side is low, that is, the voltage gain of the DC/DC converter in stable operation can only be greater than 1 (Boost) or less than 1 (Buck).

A four-switch Buck-Boost circuit structure is provided through the cascade connection of a Buck circuit and a Boost circuit as well as a shared inductance, which can realize the high-low voltage exchange and power conversion between two sides of the system, that is, the voltage gain continuously changes in a wide range, for example above 1 and below 1, thereby having great flexibility and application in the DC system.

The traditional Buck-Boost circuit often operates with diagonal switches being alternately on/off. However, under such control method, the effective value and ripple of the output current or the input current are greater compared with the inductor current, which is not advantageous to reducing the loss and improving the efficiency of the DC/DC converter. In order to improve the conversion efficiency of the Buck-Boost circuit, a two-mode operation control method is adopted. Wherein, two different modes are selected according to the requirements of voltage gain between input voltage and output voltage. The Buck mode is adopted when the voltage gain is lower than 1, and the Boost mode prevails when the voltage gain is greater than 1. However, since a dead time must be set to prevent the bridge arms from shoot-through, the duty ratio in Buck mode or Boost mode could never be close to 1 infinitely, so the voltage gain cannot be continuous around 1, which makes it difficult to realize the stable operation control of the DC/DC converter.

For this reason, it is proposed to set up an overlapping transition interval between the Buck mode and the Boost mode. For example, two ramp signals and two comparators generate the two kinds of PWM signals to control the Buck-Boost circuit, so as to achieve the continuous voltage gain. However, the method is complicate, and the method has limitations in terms of maintaining constant switching times of the DC/DC converter, maintaining symmetrical switching waveform and avoiding the influence of the dead time, etc.

SUMMARY

Embodiments of the invention provide a control method for a DC/DC converter and a DC/DC converter, which solves at least one of the technical problems.

An embodiment of a first aspect of the invention provides a control method for a DC/DC converter, where the DC/DC converter includes an inductor and two groups of switches, a first group of switches includes an even number of switches which are connected in series and coupled to a positive terminal and a negative terminal of an input capacitor, and a second group of switches includes an even number of switches which are connected in series and coupled to a positive terminal and a negative terminal of an output capacitor; the inductor is coupled between a midpoint of the first group of switches in series and a midpoint of the second group of switches in series, and the control method includes:

detecting an input voltage and an output voltage, and calculating a voltage gain according to a ratio of the output voltage to the input voltage;

determining an operating mode of the DC/DC converter according to a first threshold and the voltage gain, and setting a first duty ratio and a second duty ratio according to the mode;

detecting an inductor current and generating a current feedback signal, and setting a regulation component according to the current feedback signal; and regulating the first duty ratio or the second duty ratio according to the regulation component and generating driving signals to control the two groups of switches.

An embodiment of another aspect of the invention provides a DC/DC converter for converting an input voltage into an output voltage, including:

an input capacitor and an output capacitor, where the input capacitor and the output capacitor respectively provide the input voltage and the output voltage;

two groups of switches, where a first group of switches includes a first switch, a third switch, a fifth switch and a seventh switch that are connected in series from a positive terminal of the input capacitor to a negative terminal of the input capacitor, and a second group of switches includes a second switch, a fourth switch, a sixth switch and an eighth switch that are connected in series from a positive terminal of the output capacitor to a negative terminal of the output capacitor;

an inductor, where one end of the inductor is coupled to a midpoint between the third switch and the fifth switch of the first group of switches, and the other end thereof is coupled to a midpoint between the fourth switch and the sixth switch of the second group of switches;

two flying capacitors, where a first flying capacitor is coupled between a connection point of the first switch and the third switch and a connection point of the fifth switch and the seventh switch, and a second flying capacitor is coupled between a connection point of the second switch and the fourth switch and a connection point of the sixth switch and the eighth switch;

a controller, configured to sample the input voltage and the output voltage, calculate a voltage gain according to a ratio of the output voltage to the input voltage, determine an operating mode of the DC/DC converter according to a first threshold and the voltage gain, and set a first duty ratio and a second duty ratio according to the mode; and configured to sample an inductor current to generate a current feedback signal, set a regulation component according to the current feedback signal, regulate the first duty ratio or the second duty ratio according to the regulation component and generate driving signals to control the two groups of switches.

It should be understood that contents described in the above section of the summary are not intended to limit key or important features of the embodiments of the invention or to limit the scope of the invention. Other features of the invention will be easily understood by the following description.

DESCRIPTION OF EMBODIMENTS

Embodiments will be described in detail below in combination with the accompanying drawings. However, it should be understood that the invention provides many applicable inventive concepts that can be embodied in various specific contexts. The specific embodiments discussed herein are merely illustrative of specific ways to implement and use the invention, rather than limiting the scope of the invention.

Figure 1:
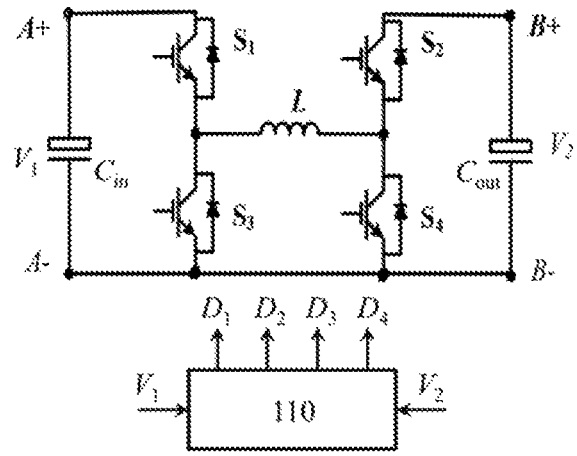
FIG. 1 is a schematic structural diagram of a DC/DC converter according to an embodiment of the invention.

FIG. 1 is a schematic structural diagram of a DC/DC converter according to an embodiment of the invention. As shown in FIG. 1, the DC/DC converter includes two groups of switches and an inductor, where the first group of switches includes a first switch $S_1$ and a third switch $S_3$ that are connected in series and are coupled between the positive terminal A+ and the negative terminal A− of an input capacitor $C_{in}$; the second group of switches includes a second switch $S_2$ and a fourth switch $S_4$ that are connected in series and are coupled between the positive terminal B+ and the negative terminal B− of an output capacitor $C_{out}$; the inductor L is coupled between a midpoint of the first switch $S_1$ and the third switch $S_3$ and a midpoint of the second switch $S_2$ and the fourth switch $S_4$. The inductor current in the DC/DC converter can be adjusted by controlling the four switches. The DC/DC converter in this invention is a bidirectional DC/DC converter, and definitions of the input and the output are just exemplary representations. In the embodiments, the A+, A− end in FIG. 1 is used as the input, and the B+, B− end is used as the output. In other embodiments, the A+, A− end in FIG. 1 may be defined as the output, and the B+, B−end may be defined as the input. Further, the DC/DC converter further includes a controller. As shown in FIG. 1, the controller 110 can detect an input voltage $V_1$, an output voltage $V_2$ and an inductor current $I_L$, and generate driving signals to drive the corresponding switches $S_1$, $S_2$, $S_3$ and $S_4$. The controller can be a PWM controller. Or, the controller 110 can be implemented as a digital controller, such as a microcontroller and/or a digital signal processor (DSP).

The method provided in this embodiment can be used to control the DC/DC converter as shown in FIG. 1. Wherein, the method provided in this embodiment can be executed by the controller to control the switches in the DC/DC converter to make the inductor current stable, thereby providing a stable current to the load and achieving a continuous voltage gain of the output voltage and the input voltage around 1.

Figure 2:
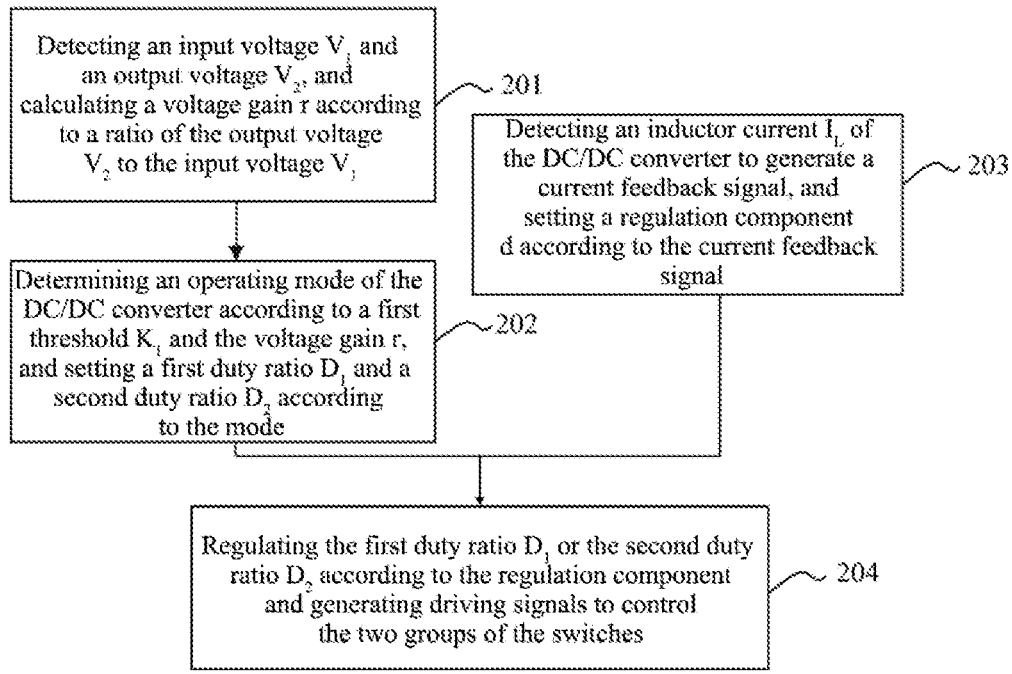
FIG. 2 is a flowchart of a control method for a DC/DC converter according to an embodiment of the invention.

FIG. 2 is a flowchart of a control method for a DC/DC converter according to an embodiment of the invention. Taking the DC/DC converter in FIG. 1 as an example, the method provided in this embodiment is as shown in FIG. 2, including:

step 201, detecting an input voltage $V_1$ and an output voltage $V_2$, and calculating a voltage gain r according to a ratio of the output voltage $V_2$ to the input voltage $V_1$.

In some embodiments, a voltage detection circuit can be provided for detecting the input voltage and the output voltage of the DC/DC converter, or a sampling unit in the controller can be used to detect the input voltage and the output voltage.

The voltage gain r is calculated by a ratio $V_2/V_1$ of the output voltage to the input voltage, and a mode in which the DC/DC converter operates is determined based on the voltage gain r.

Step 202, determining an operating mode of the DC/DC converter according to a first threshold $K_1$ and the voltage gain r, and setting a first duty ratio $D_1$ and a second duty ratio $D_2$ according to the mode.

In one embodiment, the first threshold $K_1$ may be preset. For example, the first threshold $K_1$ may also be set according to a preset switching frequency and a dead time, and then be stored in the controller. And, the first threshold $K_1$ may be set based on actual needs.

Wherein, the switching frequency refers to the frequency of driving signals of switches in the DC/DC converter, and the switching frequency has a reciprocal relationship with the switching period. The dead time refers to a protection period set to prevent the upper and lower switches of each of bridge arms as shown in FIG. 1 from being turned on at the same time. For example, when first switch $S_1$ is turned off, the third switch $S_3$ can be turned on after the dead time. In actual applications, switching frequency and dead time can be set as needed.

The duty ratio refers to the proportion of the on-time of the switch relative to the switching period in one switching period. Therefore, in one switching period, the maximum duty ratio that the DC/DC converter could achieve is obtained by dividing the result obtained from subtracting the dead time $T_{dead}$ from the switching period Ts by the switching period Ts, i.e. $(Ts-T_{dead})/Ts$, and the first threshold $K_1$ is set to be the maximum duty ratio. After transformation, $K_1=(1-f_s*T_{dead})$, and $f_s$ is the preset switching frequency.

Further, in some embodiments, the operating modes of the DC/DC converter are divided according to the first threshold $K_1$, and the operating modes in which the DC/DC converter should work are judged by the voltage gain r. Then the duty ratios of the switches are set according to different operating modes. For example, the DC/DC converter can be controlled to operate in the first mode when the voltage gain r is less than the first threshold $K_1$; the DC/DC converter can be controlled to operate in the second mode when the voltage gain r is between the first thresholds $K_1$ and 1; the DC/DC converter can be controlled to operate in the third mode when the voltage gain r is between 1 and the reciprocal of the first threshold $1/K_1$; the DC/DC converter can be controlled to operate in the fourth mode when the voltage gain r is greater than the reciprocal of the first threshold $1/K_1$. Further, the first duty ratio $D_1$ and the second duty ratio $D_2$ can be set according to different modes.

Step 203, detecting an inductor current of the DC/DC converter to generate a current feedback signal, and setting a regulation component according to the current feedback signal.

In order to ensure that the inductor current meets the expectation, the inductor current is sampled to obtain a current feedback signal, and the regulation component is generated to further adjust the duty ratio of the switches of the DC/DC converter, so that the inductor current is more stable and close to expectation.

A current detection circuit can be provided for detecting the inductor current of the DC/DC converter to generate the current feedback signal, or the sampling unit of the controller can be used to detect the inductor current.

Optionally, the current detection in step 203 may be performed simultaneously with the voltage detection in step 201, that is, the input voltage, the output voltage and the inductor current of the DC/DC converter are simultaneously sampled. Therefore, the execution sequence of step 203 and steps 201-202 is not limited.

Step 204, regulating the first duty ratio $D_1$ or the second duty ratio $D_2$ according to the regulation component and generating driving signals to control the two groups of switches.

In some embodiments, the first duty ratio or the second duty ratio is finely regulated by the closed-loop of the inductor current, and meanwhile the inductor current is controlled.

Driving signals are generated according to the regulated first duty ratio $D_1$ to control a first group of switches of the DC/DC converter; and driving signals are generated according to the regulated second duty ratio $D_2$ to control another group of switches of the DC/DC converter. For example, the first duty ratio $D_1$ can be used to control the first switch $S_1$ and the third switch $S_3$ in FIG. 1, and the second duty ratio $D_2$ can be used to control the second switch $S_2$ and fourth switch $S_4$. The output voltage of the DC/DC converter can be changed by controlling the switches, so that the voltage gain of the DC/DC converter conforms to the calculated voltage gain. Wherein, a first driving signal is generated according to the regulated first duty ratio $D_1$ to control the first switch $S_1$, and a third driving signal complementary to the first driving signal is generated to control the third switch $S_3$, that is, when the first switch $S_1$ is turned on, the third switch $S_3$ is turned off. Therefore, the first duty ratio $D_1$ can directly control the state of the first switch $S_1$, and indirectly control the state of the third switch $S_3$. Similarly, a second driving signal is generated according to the regulated second duty ratio $D_2$ to control the second switch $S_2$, and a fourth driving signal complementary to the second driving signal is generated to control the fourth switch $S_4$, that is, the second duty ratio $D_2$ can directly control the state of the second switch $S_2$, and indirectly control the state of the fourth switch $S_4$. It should be noted that, the dead time is taken into account for the two switches that are complementarily turned on and off, which will not be specifically described for simplifying the analysis below and should be understood by those skilled in the art.

Figure 3:
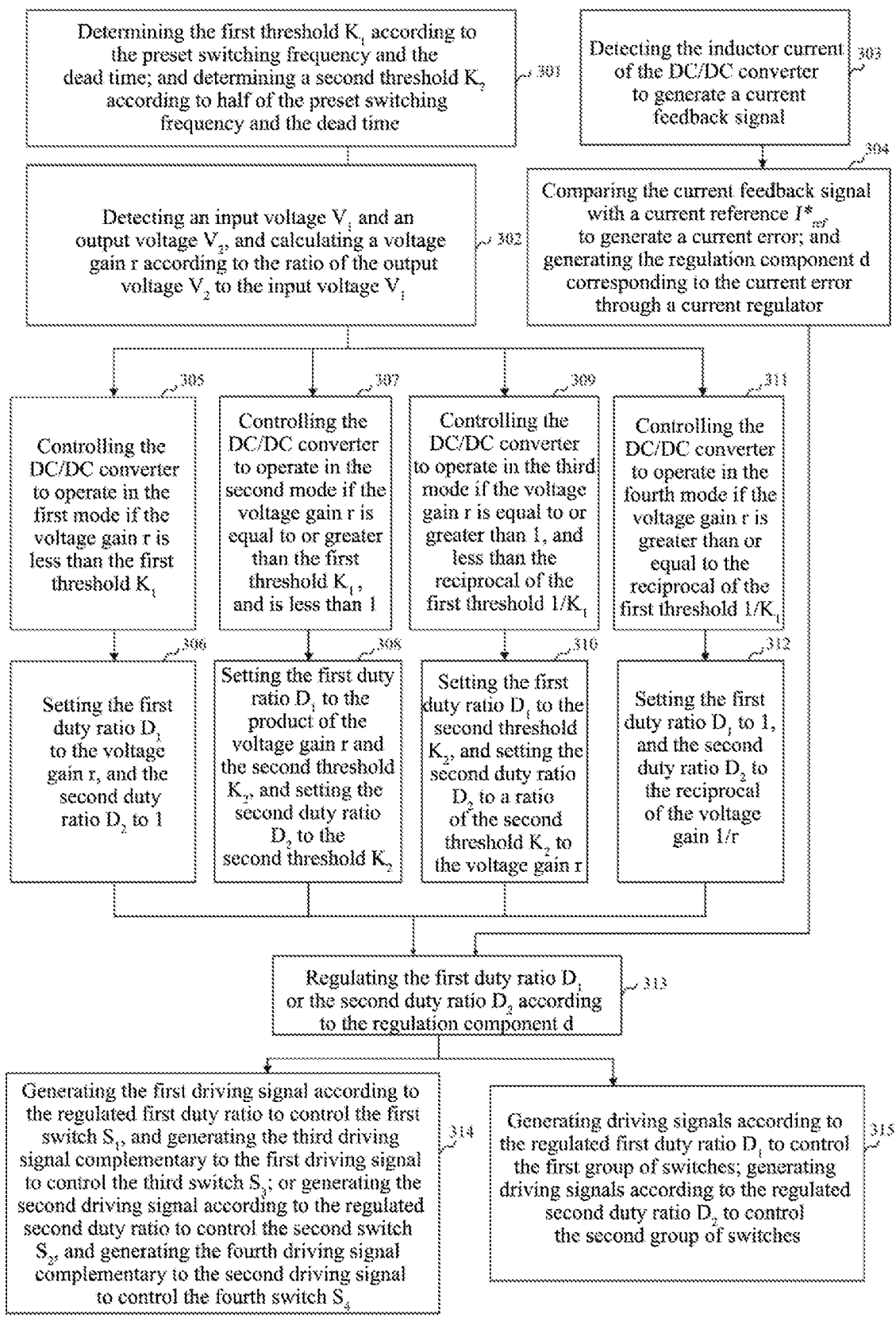
FIG. 3 is a flowchart of a control method for a DC/DC converter according to another embodiment of the invention.

Further, FIG. 3 is a flowchart of a control method for a DC/DC converter according to another embodiment of the invention. As shown in FIG. 3, the control method for a DC/DC converter provided in this embodiment includes:

Step 301, determining the first threshold $K_1$ according to the preset switching frequency and the dead time; and determining a second threshold $K_2$ according to half of the preset switching frequency and the dead time.

Wherein, the first threshold $K_1$ and the second threshold $K_2$ can be preset. In some embodiments, the first threshold is set to be $K_1=(1-f_s*T_{dead})$. In some embodiments, the switching frequency of the four switches in the second and third modes is half of switching frequency in the first mode or the fourth mode, that is, $0.5f_s$. Correspondingly, as the frequency changes, the maximum duty ratio of the switch also changes, and the second threshold $K_2$ can be set according to half of the switching frequency $0.5f_s$. The second threshold is $K_2=(1-0.5f_s*T_{dead})$. The third driving signal of the third switch $S_3$ and the first driving signal of the first switch $S_1$ are also complementary, and the fourth driving signal of the fourth switch $S_4$ and the second driving signal of the second switch $S_2$ are also complementary, with the half of the switching frequency $0.5f_s$.

Step 302, detecting an input voltage $V_1$ and an output voltage $V_2$, and calculating a voltage gain r according to the ratio of the output voltage $V_2$ to the input voltage $V_1$.

The implementations and principles of step 302 are similar to those of step 201, which will not be repeated here.

Wherein, the ratio of the output voltage $V_2$ to the input voltage $V_1$ can be used as the voltage gain r, and the operating mode of the DC/DC converter is determined according to the voltage gain r and the first threshold $K_1$, thereby controlling the switches of the DC/DC converter according to different modes.

Step 303, detecting the inductor current of the DC/DC converter to generate a current feedback signal.

The implementations and principles of step 303 are similar to those of step 203, which will not be repeated.

Similarly, in this embodiment, the detection of the input voltage and the output voltage of the DC/DC converter can also be performed simultaneously with the detection of the inductor current. That is, step 303 can be performed simultaneously with the step in step 302.

Step 304, comparing the current feedback signal with a current reference $I^*_{ref}$ to generate a current error; and generating the regulation component d corresponding to the current error through a current regulator.

The current reference $I^*_{ref}$ may be preset, and the current reference may be set to a desired current value. Therefore, the stable current can be output by regulating the inductor current. In other embodiments, the current reference can also be determined by an output of a voltage outer loop when the DC/DC converter has voltage outer loop control.

Further, the current error is calculated by comparing the current feedback signal with the current reference $I^*_{ref}$. For example, the current error can be obtained by subtracting the current reference $I^*_{ref}$ from the current feedback signal. The current error can be input to the current regulator, such that the current regulator outputs a regulation component d. The current regulator can be provided in the controller for generating the regulation component, for example, the current regulator can be a PI regulator.

In some embodiments, the step 304 may be performed before determining the operating mode of the DC/DC converter. The regulation component is first calculated according to the current feedback signal, and the operating mode of the DC/DC converter is then determined according to the voltage gain and the first threshold, then the first duty ratio and the second duty ratio are set. In some embodiments, the operating mode of the DC/DC converter may be determined before the regulation component is calculated. Therefore, the execution sequence of this step is not limited in this invention.

Wherein, average voltages at two ends of the inductor of the DC/DC converter are equal during stable operation, so the relationship of the input and the output can be expressed as:

$$D_1 * V_1 = D_2 * V_2$$

where $D_1$ refers to the first duty ratio of the first switch $S_1$, and $D_2$ refers to the second duty ratio of the second switch $S_2$. The third switch is complementary to the first switch $S_1$, and the fourth switch $S_4$ is complementary to the second switch $S_2$.

According to the above formula, $$\frac{V_2}{V_1} = \frac{D_1}{D_2}$$

can be deduced, so the voltages at two ends of the inductor can be regulated by controlling the duty ratios with the voltage gain $$r = \frac{V_2}{V_1};$$

and then the inductor current can be regulated.

Further, for steps 305, 307, 309 and 311, the specific execution step is determined based on the voltage gain r and the first threshold $K_1$. The DC/DC converter can be controlled to operate in the first mode (step 305) or in the fourth mode (step 311) when the calculated voltage gain r is far away from 1, and the first duty ratio and the second duty ratio are determined based on the voltage gain r, where only two switches need to operate at this time, specifically:

Step 305, controlling the DC/DC converter to operate in the first mode if the voltage gain r is less than the first threshold $K_1$.

In some embodiments, if the calculated voltage gain is less than the first threshold $K_1$, the voltage gain is considered to be relatively low. In this case, the DC/DC converter can be set to operate in the first mode. The first mode is the Buck mode. At this time, the switching frequency is $f_s$.

Step 306, setting the first duty ratio $D_1$ to the voltage gain r, and the second duty ratio $D_2$ to 1.

Taking FIG. 1 as an example, when the second duty ratio $D_2$ is equal to 1, the second switch $S_2$ is always in ON state, and the fourth switch $S_4$ is always in OFF state. The first switch $S_1$ and the third switch $S_3$ operate based on the duty ratio determined by the voltage gain r, so that the DC/DC converter works as a traditional Buck circuit and operates in the Buck mode. When the first switch $S_1$ is turned on and the third switch $S_3$ is turned off, the inductor stores energy; when the first switch $S_1$ is turned off and the third switch $S_3$ is turned on, the energy in the inductor is converted into a load thereto.

Step 311, controlling the DC/DC converter to operate in the fourth mode if the voltage gain r is greater than or equal to the reciprocal of the first threshold $1/K_1$.

If the voltage gain r is greater than or equal to the reciprocal of the first threshold $1/K_1$, the voltage gain r can be considered to be relatively high. In this case, the DC/DC converter can be controlled to operate in the fourth mode, that is, in the Boost mode.

Step 312, setting the first duty ratio $D_1$ to 1, and the second duty ratio $D_2$ to the reciprocal of the voltage gain $1/r$.

When the voltage gain r is greater than $1/K_1$, the DC/DC converter enters to the fourth mode (Boost mode), so that the first duty ratio is equal to 1 and the second duty ratio is set to be the reciprocal of the voltage gain, that is, $D_1=1$, $D_2=1/r$. The first switch $S_1$ is controlled to be in ON state constantly in this mode, and correspondingly the third switch $S_3$ to be in OFF state; and the second switch $S_2$ and the fourth switch $S_4$ operate according to the duty ratio $1/r$ determined according to the voltage gain, so that the DC/DC converter works in the Boost mode. When the fourth switch $S_4$ is turned on and the second switch $S_2$ is turned off, the inductor stores energy; when the fourth switch $S_4$ is turned off and the second switch $S_2$ is turned on, the energy in the input capacitor $C_{in}$ and the inductor is converted into the load thereto.

Further, when the voltage gain r is around 1, the DC/DC converter can be set to operate in a Buck-Boost overlapping mode (Buck-Boost mode) in order to achieve continuous voltage gain; specific mode selection is performed for the voltage gain being greater than 1 or the voltage gain being less than 1 (step 307/step 309); and the first duty ratio and the second duty ratio are determined based on the second threshold $K_2$. In this case, the four switches need to work together to ensure a stable voltage gain around 1, specifically:

Step 307, controlling the DC/DC converter to operate in the second mode if the voltage gain r is equal to or greater than the first threshold $K_1$, and is less than 1.

Wherein, the switching frequency in the second mode is half of the switching frequency in the first mode, that is, $0.5 f_s$.

Step 308, setting the first duty ratio $D_1$ to the product of the voltage gain r and the second threshold $K_2$, and setting the second duty ratio $D_2$ to the second threshold $K_2$.

In the second mode, the voltage gain is greater than or equal to the first threshold $K_1$ and is less than 1, and the DC/DC converter is controlled to operate in the Buck-Boost mode. In the second mode, the first duty ratio $D_1$ is set to be the product of the voltage gain r and the second threshold $K_2$, and the second duty ratio $D_2$ is set to the second threshold $K_2$; thus the duty ratio of the first switch $S_1$ is obtained after proportional transformation with the voltage gain and the second threshold, $D1=r*K_2$, and the duty ratio of the second switch $S_2$ is fixed as $D_2=K_2$.

Step 309, controlling the DC/DC converter to operate in the third mode if the voltage gain r is equal to or greater than 1, and less than the reciprocal of the first threshold $1/K_1$.

Wherein, the switching frequency in the third mode is half of the switching frequency in the first mode, that is, $0.5 f_s$.

Step 310, setting the first duty ratio $D_1$ to the second threshold $K_2$ and setting the second duty ratio $D_2$ to a ratio of the second threshold $K_2$ and the voltage gain r.

When the voltage gain r is greater than or equal to 1 and is less than the reciprocal of the first threshold $1/K_1$, the DC/DC converter is controlled to operate in the third mode. In the third mode, the first duty ratio can be set to the second threshold, and the second duty ratio can be set to a ratio of the second threshold to the voltage gain, that is, $D_1=K_2$, $D_2=K_2/r$. Therefore, the duty ratio of the first switch $S_1$ is fixed as $D_1=K_2$, and the duty ratio of the second switch $S_2$ is set after proportional transformation with the ratio of the voltage gain to the second threshold, that is, $D_2=K_2/r$.

Step 313, regulating the first duty ratio $D_1$ or the second duty ratio $D_2$ according to the regulation component d.

Wherein, in the first mode, the first duty ratio $D_1$ is set to be the voltage gain r, the second duty ratio $D_2$ is set to be 1, and the first duty ratio $D_1$ is slightly regulated according to the regulation component d. In the second mode, the first duty ratio $D_1$ is set to be the product of the voltage gain r and the second threshold $K_2$, the second duty ratio $D_2$ is set to be the second threshold $K_2$, and the first duty ratio $D_1$ is slightly regulated according to the regulation component d. In the third mode, the first duty ratio $D_1$ is set to be the second threshold $K_2$, the second duty ratio $D_2$ is set to be the ratio of the second threshold $K_2$ to the voltage gain r, and the second duty ratio $D_2$ is slightly regulated according to the regulation component d. In the fourth mode, the first duty ratio $D_1$ is set to be 1, the second duty ratio $D_2$ is set to be the reciprocal of the voltage gain r, and the second duty ratio $D_2$ is slightly regulated according to the regulation component d.

Step 314, generating the first driving signal according to the regulated first duty ratio to control the first switch $S_1$, and generating the third driving signal complementary to the first driving signal to control the third switch $S_3$; or generating the second driving signal according to the regulated second duty ratio to control the second switch $S_2$, and generating the fourth driving signal complementary to the second driving signal to control the fourth switch $S_4$.

Wherein, the regulated first duty ratio can be used to directly generate the first driving signal of the first switch $S_1$ and indirectly generate the third driving signal of the third switch $S_3$; and the regulated second duty ratio can be used to directly generate the second driving signal of the second switch $S_2$ and indirectly generate the fourth driving signal of the fourth switch $S_4$. When the first switch $S_1$ is turned on, the third switch $S_3$ is turned off; similarly, when the second switch $S_2$ is turned on, the fourth switch $S_4$ is turned off, and vice versa. Thereby, four driving signals are generated based on the regulated first duty ratio and the second duty ratio for driving the switches $S_1$, $S_2$, $S_3$ and $S_4$, respectively, thereby controlling the DC/DC converter to achieve the required voltage gain.

In the first and second modes, the regulation component is only used to regulate the first duty ratio $D_1$, the second duty ratio $D_2$ is not regulated, and then the first switch $S_1$ and the third switch $S_3$ are controlled to be turned on and turned off based on the regulated first duty ratio, while the second switch $S_2$ and the fourth switch $S_4$ are controlled to be turned on and turned off based on the second duty ratio that is not regulated. In the third and fourth modes, the regulation component is only used to regulate the second duty ratio $D_2$, the first duty ratio $D_1$ is not regulated, and then the first switch $S_1$ and the third switch $S_3$ are controlled to be turned on and turned off based on the first duty ratio that is not regulated, while the second switch $S_2$ and the fourth switch $S_4$ are controlled to be turned on and turned off based on the regulated second duty ratio.

Further, the phase of the driving signals generated by the regulated first duty ratio is the same as the phase of the driving signals generated by the regulated second duty ratio. In some embodiments, the driving signals generated by the regulated first duty ratio and the driving signal generated by the regulated second duty ratio may be 180° out of phase or may be out of phase with other angles, and the invention is not limited thereto.

Figure 4:
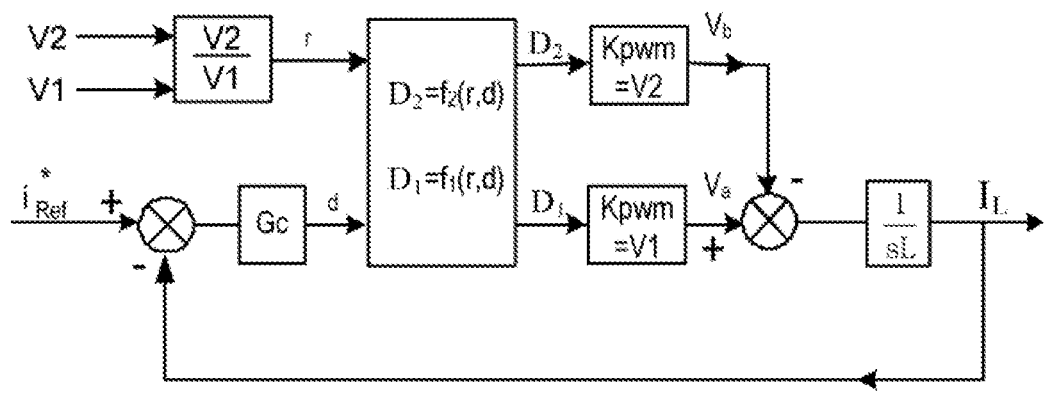
FIG. 4 is a control block diagram of a DC/DC converter according to an embodiment of the invention.

FIG. 4 is a control block diagram of a control method according to an embodiment of the invention.

As shown in FIG. 4, $V_1$ is the input voltage of the DC/DC converter, $V_2$ is the output voltage, and the voltage gain r is determined according to $V_1$ and $V_2$; $I^*_{ref}$ is the current reference, $I_L$ is the inductor current, and the regulation component d can be obtained based on the current reference $I^*_{ref}$ and the inductor current $I_L$; and the first duty ratio $D_1$ and the second duty ratio $D_2$ are determined according to both the calculated voltage gain r and the regulation component d, thereby achieving the closed loop control.

Figure 5A:
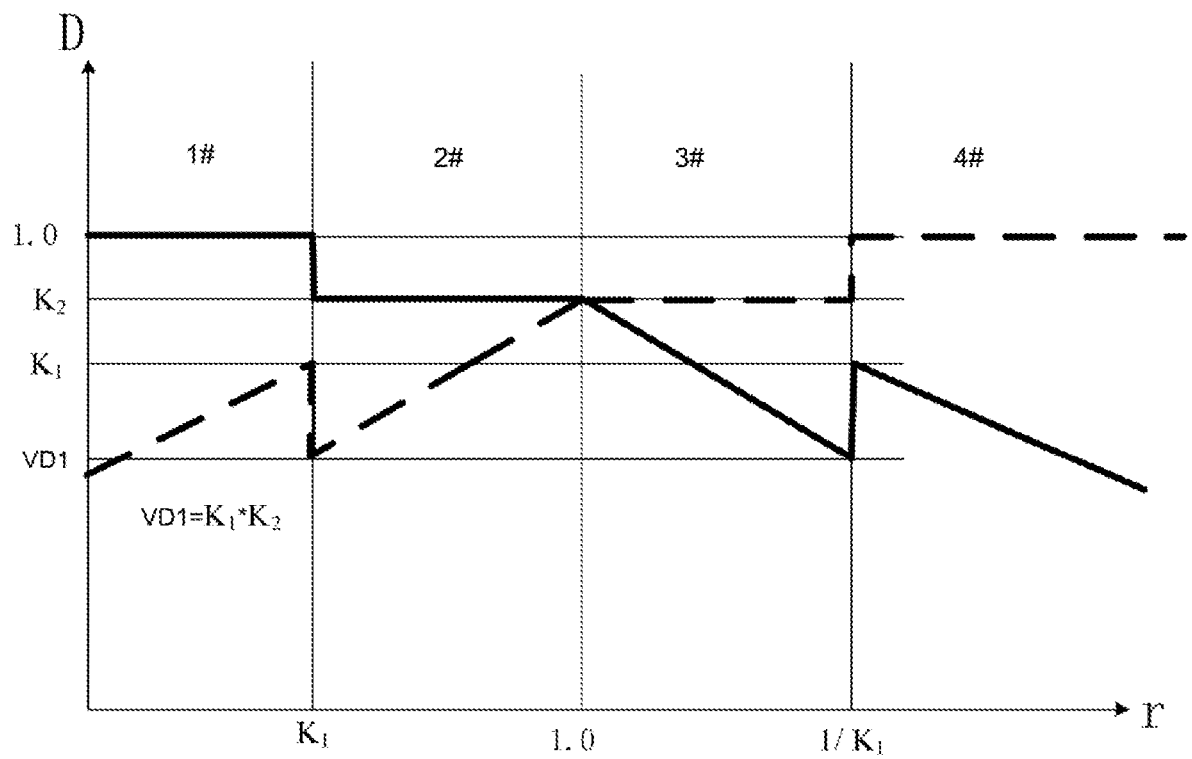
FIG. 5A is a schematic diagram showing a relationship between a voltage gain and a duty ratio according to an embodiment of the invention.

FIG. 5A is a schematic diagram showing a relationship between a voltage gain and a duty ratio according to an embodiment of the invention. As shown in FIG. 5A, the abscissa is the voltage gain r, the ordinate is the duty ratio D, where the solid line indicates the second duty ratio $D_2$, and the dotted line indicates the first duty ratio $D_1$.

As shown in FIG. 5A, when the voltage gain r is less than the first threshold $K_1$, which belongs to the first mode (1 #), the second duty ratio $D_2$ is set to be 1, and the first duty ratio $D_1$ is set to be the voltage gain; when the voltage gain r is between the first threshold $K_1$ and 1, which belongs to the second mode (2 #), the second duty ratio $D_2$ is set to be the second threshold $K_2$, and the first duty ratio $D_1$ is equal to a product of the voltage gain r and the second the threshold $K_2$; when the voltage gain r is between 1 and the reciprocal $1/K_1$ of the first threshold, which belongs to the third mode (3 #), the first duty ratio $D_1$ is set to the second threshold $K_2$, and the second duty ratio $D_2$ is set to be a ratio of the second threshold $K_2$ to the voltage gain r; when the voltage gain r is greater than the reciprocal of the first threshold $K_1$, which belongs to the fourth mode (4 #), the first duty ratio $D_1$ is set to be 1, and the second duty ratio $D_2$ is set to be the reciprocal of the voltage gain r.

The operating modes of the DC/DC converter can be determined by the first threshold $K_1$ and the ratio of the output voltage $V_2$ to the input voltage $V_1$; in the second and third modes (Buck-Boost modes), based on the overlapping mode, continuous voltage gain can be achieved by the jumped duty ratio and proportional transformation. In addition, the first duty ratio and/or the second duty ratio are/is slightly regulated by the inductor current, thereby achieving a more accurate output current of the DC/DC converter.

Figure 5B:
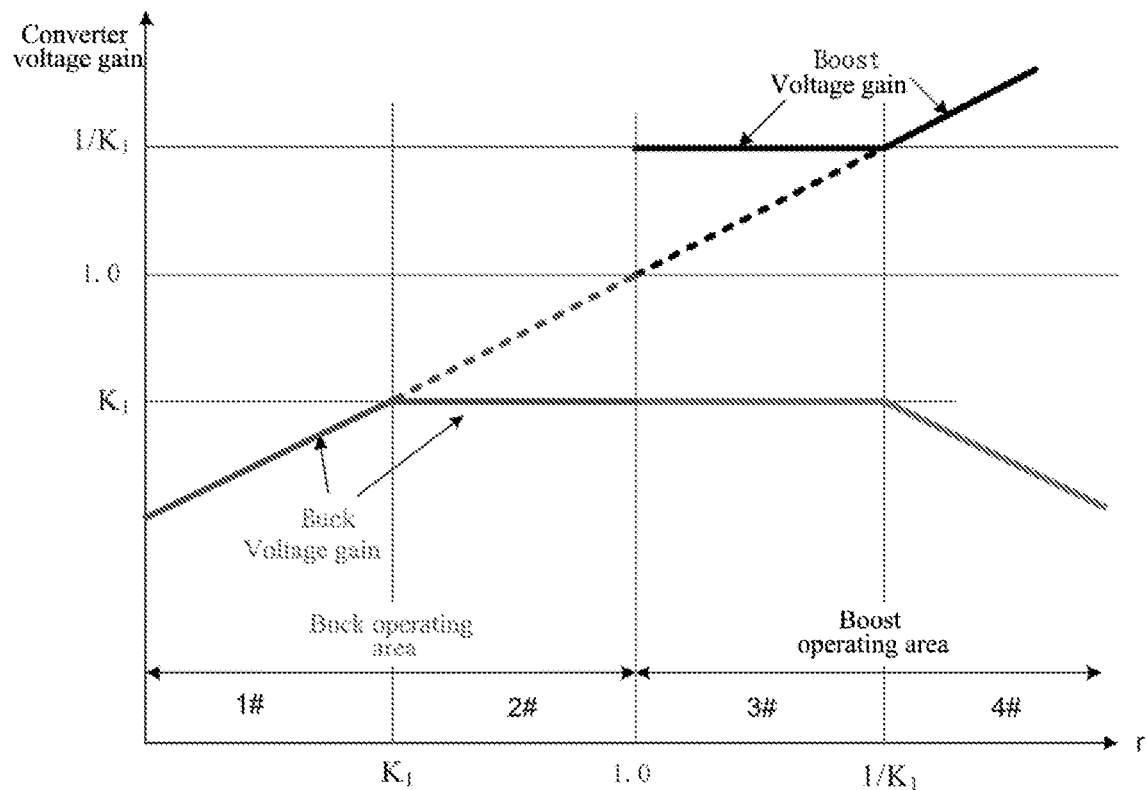
FIG. 5B is a schematic diagram showing a voltage gain according to an embodiment of the invention.

FIG. 5B is a schematic diagram showing a voltage gain according to an embodiment of the invention. As shown in FIG. 5B, the abscissa is the calculated voltage gain and the ordinate is the actual voltage gain. The solid line indicates the voltage gain that can be achieved in the prior art and the dotted line indicates the voltage gain that can be achieved in the invention. Wherein, the left broken line indicates the voltage gain of the DC/DC converter in the Buck mode, and the right broken line indicates the voltage gain of the DC/DC converter in the Boost mode. In the method provided by this embodiment, it can be seen from the figure that in mode 1 #, the DC/DC converter only operates in the Buck mode; in mode 4 #, the DC/DC converter only operates in the Boost mode; in modes 2 # and 3 #, the DC/DC converter operates in the Buck and Boost overlapping mode (Buck-Boost mode), and the overlapping voltage gain is shown in the dotted line. And when the target voltage gain is around 1, by controlling the DC/DC converter to operate in the Buck-Boost mode and by using the jumped duty ratio and the proportional transformation, the voltage gain of DC/DC converter can be changed linearly near 1. On the other hand, in this embodiment, the switch frequency will be reduced by a half in modes 2 # and 3 #, so the loss of the all switches will not increase.

Figure 5C:
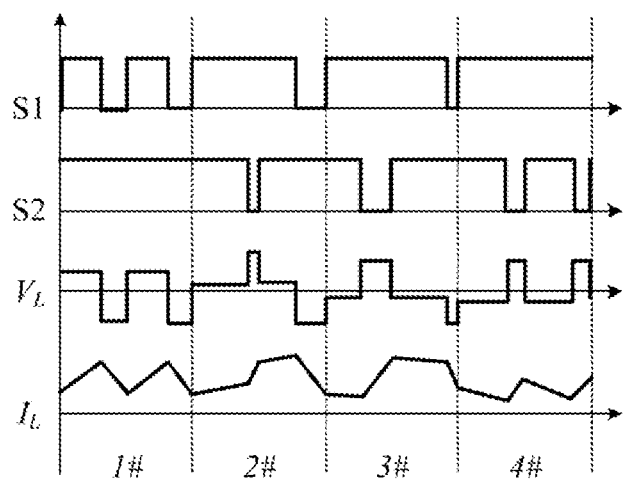
FIG. 5C shows waveforms of driving signals, inductor voltage and inductor current according to an embodiment of the invention.

FIG. 5C shows waveforms of driving signals, inductor voltage and inductor current according to an embodiment of the invention.

As shown in FIG. 5C, in mode 1 #, the second duty ratio is set to be 1, so the second driving signal of the second switch $S_2$ is maintained at high level, and the second switch $S_2$ is in ON state; correspondingly, the fourth switch $S_4$ is in OFF state. The first duty ratio is set to be the voltage gain r, so the first driving signals of the first switch $S_1$ and the third switch $S_3$ are determined according to the regulated first duty ratio that is determined by the voltage gain r, and the first switch $S_1$ and the third switch $S_3$ are alternately turned on.

In mode 2 #, the switching frequency is half of that in the first mode or the fourth mode. The duty ratio of the second switch $S_2$ is set to $K_2$, and correspondingly, the duty ratio of the fourth switch $S_4$ is set to $1-K_2$, and corresponding driving signals are generated according to the regulated duty ratios to drive the second switch $S_2$ and the fourth switch $S_4$. The duty ratio of the first switch $S_1$ is set to $r*K_2$, and correspondingly, the duty ratio of the third switch $S_3$ is set to $1-r*K_2$, and the driving signals are generated according to the corresponding regulated duty ratios to drive the first switch $S_1$ and the third switch $S_3$. In this mode, the first driving signal of the first switch $S_1$ and the second driving signal of the second switch $S_2$ may be in phase or may be out of phase with a certain angle.

In mode 3 #, the switching frequency is half of that in the first mode or the fourth mode. And the duty ratio of the first switch $S_1$ is set to $K_2$, and correspondingly, the duty ratio of the third switch $S_3$ is set to $1-K_2$, and corresponding driving signals are generated according to the regulated duty ratios to drive the first switch $S_1$ and the third switch $S_3$. The duty ratio of the second switch $S_2$ is set to $K_2/r$, while correspondingly, the duty ratio of the fourth switch $S_4$ is set to $1-K_2/r$, and the driving signals are generated according to the corresponding regulated duty ratios to drive the second switch $S_2$ and the fourth switch $S_4$, so that the DC/DC converter operates in the Buck-Boost mode. In Buck-Boost mode, the first driving signal of the first switch $S_1$ and the second driving signal of the second switch $S_2$ may be in phase or may be out of phase with a certain angle.

In mode 4 #, the duty ratio of the first switch $S_1$ is set to be 1, and the first driving signal is maintained at high level, that is, the first switch $S_1$ is in ON state; and correspondingly, the duty ratio of the third switch $S_3$ is 0, and the third switch $S_3$ is in OFF state. In addition, duty ratios of the second switch $S_2$ and the fourth switch $S_4$ is determined by the voltage gain r, and the second switch $S_2$ and the fourth switch $S_4$ are alternately turned on, so that the DC/DC converter operates in the Boost mode.

A detailed embodiment is given below to illustrate the method provided in this embodiment. In this embodiment, the DC/DC converter is a Buck-Boost DC/DC converter as shown in FIG. 1. The preset switching frequency is $f_s$=60 kHz, and the first threshold is $K_1=1-f_s*T_{dead}$=0.92; when half of the switching frequency is 30 kHz, the second threshold $K_2=1-0.5*f_s*T_{dead}$=0.96.

Figure 6:
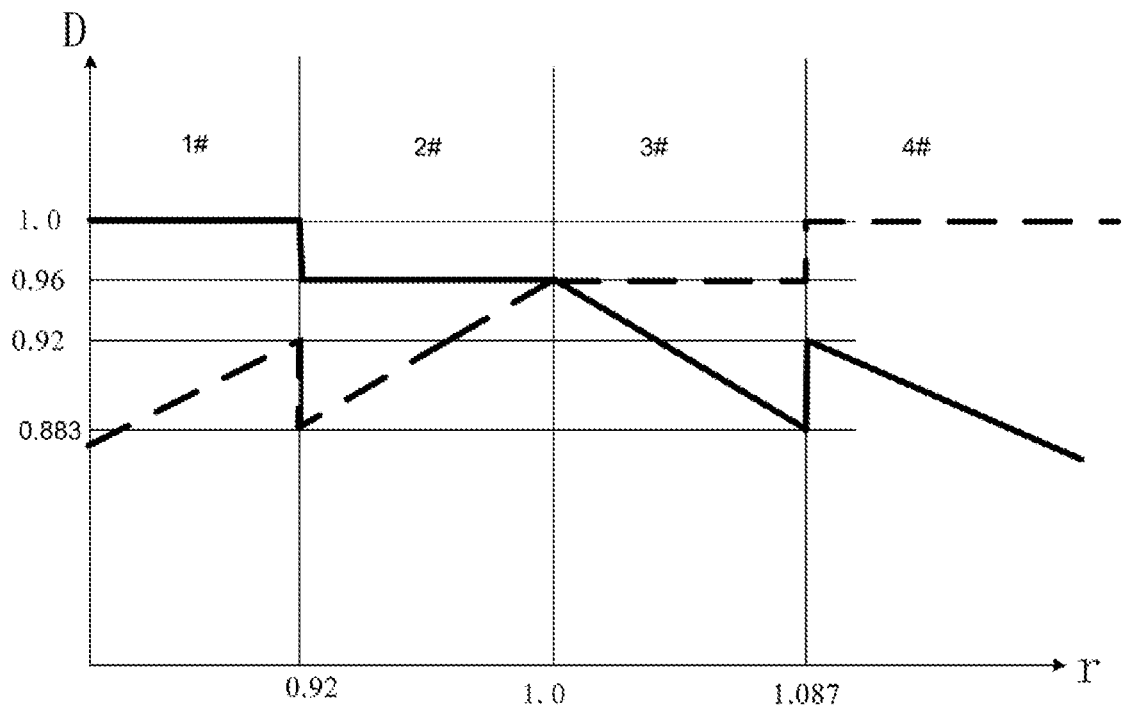
FIG. 6 is a schematic diagram showing a relationship between a voltage gain and a duty ratio according to an embodiment of the invention.

FIG. 6 is a schematic diagram showing a relationship between a voltage gain and a duty ratio according to an embodiment of the invention. The dotted line indicates the first duty ratio and the solid line indicates the second duty ratio.

As shown in FIG. 6, assuming that the voltage gain is much less than 1 at the beginning, the DC/DC converter operates in mode #1, that is, in the first mode (Buck mode), the second duty ratio $D_2$ (solid line) is 1, and the first duty ratio $D_1$ (dotted line) is set to the voltage gain r. Subsequently, the voltage gain $r(V_2/V_1)$ is gradually increased, and the first duty ratio $D_1$ is gradually increased therewith. When the voltage gain r is increased to 0.92 (that is, the first threshold), the first duty ratio $D_1$ also reaches 0.92.

At this time, the DC/DC converter enters to the mode #2, i.e. the second mode (Buck-Boost mode). In order to reduce the switching loss, the switching frequency is reduced to 30 kHz. At this time, the first duty ratio $D_1$ jumps to a value that is the product (0.883) of the voltage gain r and the second threshold K2, that is, the product of 0.92 and 0.96. At the same time, the second switch $S_2$ starts to operate with the switching frequency of 30 kHz and the second duty ratio $D_2$ of 0.96 (the second threshold) from the ON state. And the second driving signal of the second switch $S_2$ and the first driving signal of the first switch $S_1$ are in phase or are out of phase with a certain angle. And subsequently, with the increase of the voltage gain r, the first duty ratio $D_1$ is set to $r*K_2$ and the second duty ratio $D_2$ is maintained at 0.96.

If the voltage gain r is increased to 1, the first duty ratio $D_1$ will be increased to 0.96 (the second threshold) therewith. Subsequently, when the voltage gain r is increased, the DC/DC converter comes to the mode #3, i.e. the third mode (Buck-Boost mode), the first duty ratio $D_1$ is set to the second threshold of 0.96, and the second duty ratio $D_2$ is changed from the fixed duty ratio of 0.96 to the ratio of the second threshold $K_2$ to the voltage gain r ($K_2/r$), and with the voltage gain r increasing, the second duty ratio $D_2$ is reduced. And the driving signals generated by the regulated first duty ratio and the driving signals generated by the regulated second duty ratio are in phase or are out of phase with a certain angle.

When the voltage gain r is increased to 1.087 (the reciprocal of the first threshold of 0.92), the first duty ratio $D_1$ jumps from 0.96 (the second threshold $K_2$) to 1, and the second duty ratio $D_2$ jumps from 0.883 ($K_2/r$=0.96/1.087) to 0.92 (the reciprocal of the voltage gain of 1.087). Subsequently, the DC/DC converter enters to the mode #4, i.e. the fourth mode (the Boost mode), the first duty ratio $D_1$ of the first switch $S_1$ is 1, and the first switch $S_1$ maintains ON state; the second duty ratio $D_2$ is changed to $1/r$ and is changed with the voltage gain r; and the switching frequency jumps from 30 kHz to 60 kHz.

In some embodiments, step 315 can also be performed after step 313 is completed.

Step 315, generating driving signals according to the regulated first duty ratio to control the first group of switches; generating driving signals according to the regulated second duty ratio to control the second group of switches.

Figure 7:
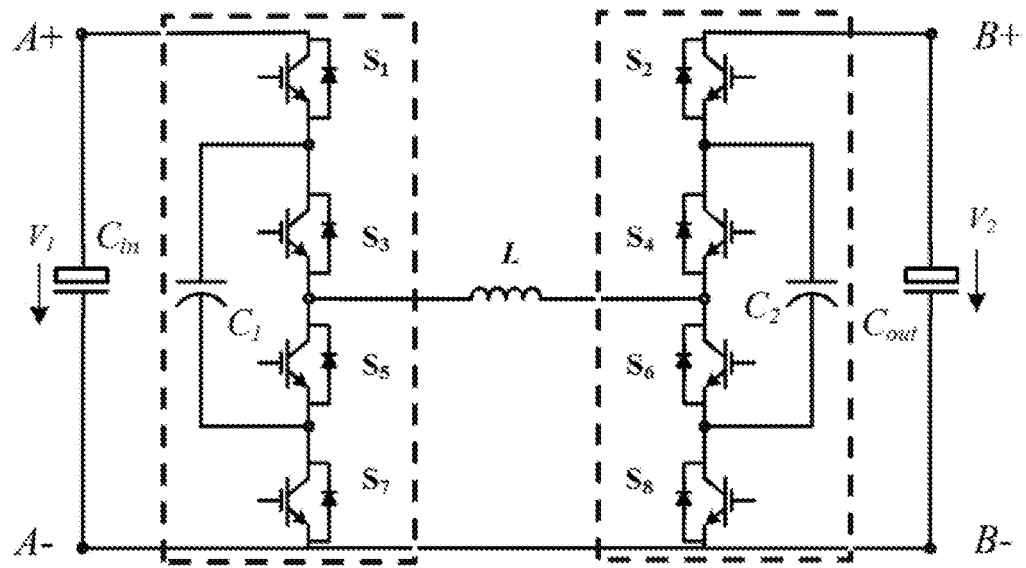
FIG. 7 is a schematic diagram of another DC dual-bridge-arm bidirectional DC/DC converter according to an embodiment of the invention.

In some embodiments, the DC/DC converter is multi-level DC/DC converter including two groups of switches. As shown in FIG. 7, the first group of switches includes four switches for example, a first switch $S_1$, a third switch $S_3$, a fifth switch $S_5$ and a seventh switch $S_7$ that are connected in series from the positive terminal A+ of the input capacitor $C_{in}$ to the negative terminal A− of the input capacitor $C_{in}$. The second group of switches includes another four switches, for example, a second switch $S_2$, a fourth switch $S_4$, a sixth switch $S_6$ and an eighth switch $S_8$ that are connected in series from the positive terminal B+ of the output capacitor $C_{out}$ to the negative terminal B− of the output capacitor $C_{out}$.

The DC/DC converter further includes an inductor, one end of the inductor is coupled to a midpoint between the third switch $S_3$ and the fifth switch $S_5$ of the first group of switches, and the other end thereof is coupled to a midpoint between the second switch $S_4$ and the sixth switch $S_6$ of the second group of switches. The DC/DC converter further includes two flying capacitors, where one end of a first flying capacitor $C_1$ is coupled to a connection point between the first switch $S_1$ and the third switch $S_3$, and the other end thereof is coupled to a connection point between the fifth switch $S_5$ and the seventh switch $S_7$; one end of a second flying capacitor $C_2$ is coupled to a connection point between the second switch $S_2$ and the fourth switch $S_4$, and the other end thereof is coupled to a connection point between the sixth switch $S_6$ and the eighth switch $S_8$.

Wherein, the first switch $S_1$ and the seventh switch $S_7$ turn on and off complementarily, and the third switch $S_3$ and the fifth switch $S_5$ turn on and off complementarily; the second switch $S_2$ and the eighth switch $S_8$ turn on and off complementarily, and the fourth switch $S_4$ and the sixth switch $S_6$ turn on and off complementarily. Further, the duty ratios of the first driving signal of the first switch $S_1$ and the third driving signal of the third switch $S_3$ are same, and the first driving signal and the third driving signal are 180° out of phase; the duty ratios of the second driving signal of the second switch $S_2$ and the fourth driving signal of the fourth switch $S_4$ are same, and the second driving signal and the fourth driving signal are 180° out of phase.

Further, the first group of switches forms an A-bridge arm, that is, $S_1$, $S_3$, $S_5$, and $S_7$ make up the A-bridge arm of the DC/DC converter. The second group of switches forms a B-bridge arm, that is, $S_2$, $S_4$, $S_6$, and $S_8$ make up the B-bridge arm of the DC/DC converter. The duty ratios of switches on such two bridge arms can be controlled separately.

When the voltage gain is in the second mode and the third mode, the first driving signals and the second driving signal are in phase or 180° out of phase, and the third driving signals and the fourth the third driving signal are in phase or 180° out of phase. In some other embodiments, the driving signals may also be out of phase with other angles.

The process of controlling the DC/DC converter shown in FIG. 7 based on the method provided in the embodiments is described in detail below.

Assuming that the preset switching frequency is 30 kHz, the first threshold is $K_1$=0.94; when half of the switching frequency is 15 kHz, the second threshold is $K_2$=0.97.

When the voltage gain is much less than 1 at the beginning, the DC/DC converter operates in the first mode, the switching frequency is 30 kHz, and the second switch $S_2$ and the fourth switch $S_4$ of the B-bridge arm are always turned on. The equivalent frequency of the inductor voltage is 60 kHz.

Then the voltage gain $r(V_2/V_1)$ is gradually increased, the first duty ratio $D_1$ is gradually increased, and when r is increased to 0.94, the first duty ratio $D_1$ reaches to 0.94. At this time, the switching frequency is changed to 15 kHz. And the first duty ratio $D_1$ jumps to 0.912 (the product of the voltage gain r and the second switching threshold 0.97). At the same time, the second switch $S_2$ and the fourth switch $S_4$ start to work with the switching frequency of 15 kHz and the second duty ratio $D_2$ is set to 0.97, and the driving signals of the first switch $S_1$ and the second switch $S_2$ are in phase or 180° out of phase.

If the voltage gain r is increased to 1, the first duty ratio $D_1$ will be increased accordingly to 0.97. Afterwards, when the voltage gain r is continuously increased, the first duty ratio $D_1$ is maintained constant (0.97), while the second duty ratio $D_2$ is switched from a fixed duty ratio to floating with the voltage gain r. And the second duty ratio $D_2$ is set to $K_2/r$ and decreased with the increasing of r.

When the voltage gain r is increased to 1.064 (the reciprocal of the first threshold of 0.94), the first duty ratio $D_1$ jumps to 1 (the ON state) from 0.97; the second duty ratio $D_2$ jumps to 0.94 from 0.912 and continues to change with the voltage gain r; and the switching frequency jumps from 15 kHz to 30 kHz.

Figure 8A:
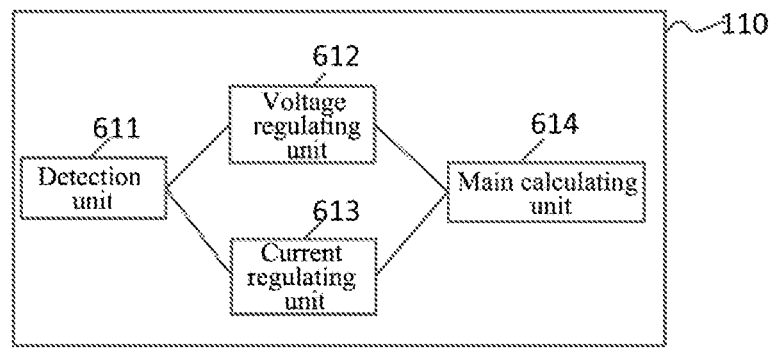
FIG. 8A is a schematic structural diagram of a controller in a DC/DC converter according to an embodiment of the invention.

FIG. 8A is a schematic structural diagram of a controller in a DC/DC converter according to an embodiment of the invention. As shown in FIG. 8A, the DC/DC converter includes a controller 110, for example, the controller 110 is configured to control the two groups of switches as shown in FIG. 1.

Further, the controller 110 includes: a detection unit 611 (e.g. a sampling unit), configured to detect the input voltage $V_1$, the output voltage $V_2$, and detect the inductor current $I_L$ to generate a current feedback signal; a voltage regulating unit 612, configured to calculate the voltage gain r according to the ratio of the output voltage $V_2$ to the input voltage $V_1$, and determine operating modes of the DC/DC converter according to the first threshold $K_1$ and the voltage gain r, and set the first duty ratio $D_1$ and the second duty ratio $D_2$ according to the mode; a current regulating unit 613, configured to set the regulation component according to the current feedback signal; a main calculating unit 614, configured to regulate the first duty ratio $D_1$ or the second duty ratio $D_2$ according to the regulation component and generate driving signals to control the switches.

The controller 110 can be used to control the two groups of switches as shown in FIG. 1. Similarly, the controller in FIG. 8A can be used to control the two groups of switches in the DC/DC converter as shown in FIG. 7. In the DC/DC converter provided by the embodiment, the specific principles and implementations of the controller 110 are similar to those in the embodiment shown in FIG. 2, and details thereof will not be repeated here.

Figure 8B:
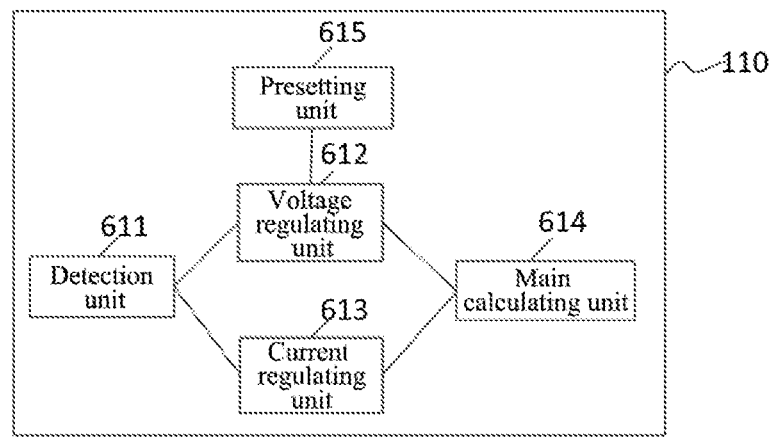
FIG. 8B is a schematic structural diagram of a controller in a DC/DC converter according to another embodiment of the invention.

FIG. 8B is a schematic structural diagram of a controller in a DC/DC converter according to another embodiment of the invention. As shown in FIG. 8B, the controller 110 further includes a presetting unit 615, configured to determine the first threshold $K_1$ according to the preset switching frequency $f_s$ and the dead time $T_{dead}$; and determine the second threshold $K_2$ according to half of the preset switching frequency $0.5f_s$ and the dead time $T_{dead}$.

In some embodiments, the current regulating unit 613 is configured to compare the current feedback signal with the current reference $I^*_{ref}$ to generate the current error; and determine the regulation component corresponding to the current error through a current regulator.

The voltage regulating unit 612 is configured to determine the operating modes of the DC/DC converter according to the voltage gain r and the first threshold $K_1$ as follows:

controlling the DC/DC converter to operate in the first mode if the voltage gain r is less than the first threshold $K_1$;

controlling the DC/DC converter to operate in the second mode if the voltage gain r is equal to or greater than the first threshold $K_1$ and less than 1;

controlling the DC/DC converter to operate in the third mode if the voltage gain r is equal to 1 or greater than 1 and less than a reciprocal of the first threshold $1/K_1$;

controlling the DC/DC converter to operate in the fourth mode if the voltage gain r is greater than or equal to the reciprocal of the first threshold $1/K_1$.

If the voltage gain belongs to the first mode, the voltage regulating unit 612 is further configured to set the first duty ratio $K_1$ to be the voltage gain r and set the second duty ratio to 1.

If the voltage gain belongs to the fourth mode, the voltage regulating unit 612 is further configured to set the first duty ratio to 1, and set the second duty ratio to be a reciprocal of the voltage gain $1/r$.

If the voltage gain belongs to the second mode, the voltage regulating unit 612 is further configured to set the first duty ratio to be the product $r*K_2$ of the voltage gain r and the second threshold $K_2$, and set the second duty ratio to be the second threshold $K_2$.

If the voltage gain belongs to the third mode, the voltage regulating unit 612 is further configured to set the first duty ratio to be the second threshold $K_2$, and set the second duty ratio to be the ratio $K_2/r$ of the second threshold $K_2$ to the voltage gain r.

Optionally, when the DC/DC converter operates in the second mode or in the third mode, the switching frequency of the switch is half of the switching frequency in the first mode or the fourth mode. Optionally, in the second mode and the third mode, the driving signals generated by the first duty ratio and the second duty ratio are in phase or are out of phase with a certain angle.

The controller 110 can also be used to control the flying-capacitor three-level DC/DC converter shown in FIG. 7, and the main calculating unit 614 is configured to control the first group of switches ($S_1$, $S_3$, $S_5$, $S_7$) according to the regulated first duty ratio, and control the second group of switches ($S_2$, $S_4$, $S_6$, $S_8$) according to the regulated second duty ratio. Wherein the first switch $S_1$ and the seventh switch $S_7$ turn on and off complementarily, and the third switch $S_3$ and the fifth switch $S_5$ turn on and off complementarily; the second switch $S_2$ and the eighth switch $S_8$ turn on and off complementarily, and the fourth switch $S_4$ and the sixth switch $S_6$ turn on and off complementarily. Further, the duty ratio of the first switch $S_1$ is the same as the third switch $S_3$, and the driving signals of the two switches $S_1$ and $S_3$ are 180° out of phase. Similarly, the duty ratio of the second switch $S_2$ is the same as the fourth switch $S_4$, and the driving signals thereof are 180° out of phase.

Optionally, in the second mode and the third mode, the driving signals of the first switch $S_1$ and the second switch $S_2$ are in phase or 180° out of phase; the driving signals of the third switch $S_3$ and the fourth switch $S_4$ are in phase or 180° out of phase. In some other embodiments, the driving signals may also be out of phase with other angles.

In the Buck-Boost DC/DC converter provided in this embodiment, the specific principles and implementations of the controller 110 are similar to those of the embodiment shown in FIG. 3, and details thereof will not be repeated here.

An embodiment further provides a computer readable storage medium having a computer program stored thereon, where the computer program is executed by a processor to implement the control method according to any of the DC/DC converters as described above.

A person skilled in the art can understand that all or some of the steps for implementing the above method embodiments may be completed by using hardware related program instructions. The foregoing program may be stored in a computer readable storage medium, and when the program is executed, the steps of the foregoing method embodiments are performed; the foregoing storage medium includes a medium that can store program codes, such as a ROM, a RAM, a magnetic disk, or an optical disk.

Finally, it should be noted that the above embodiments are merely illustrative of the technical solutions of the invention, and are not to be taken in a limiting sense; although the invention has been described in detail with reference to the above embodiments, those skilled in the art will understand that they may still modify the technical solutions described in the above embodiments, or equivalently substitute some or all of the technical features; and the modifications or substitutions do not deviate the nature of the corresponding technical solutions from the modes of the technical solutions of the embodiments of the invention.

What is claimed is:

1. A control method for a DC/DC converter, wherein the DC/DC converter comprises an inductor and two groups of switches, a first group of switches comprises an even number of switches which are connected in series and coupled to a positive terminal and a negative terminal of an input capacitor, and a second group of switches comprises an even number of switches which are connected in series and coupled to a positive terminal and a negative terminal of an output capacitor; the inductor is coupled between a midpoint of the first group of switches in series and a midpoint of the second group of switches in series, and the control method comprises:
   detecting an input voltage and an output voltage, and calculating a voltage gain according to a ratio of the output voltage to the input voltage;
   determining an operating mode of the DC/DC converter according to a first threshold and the voltage gain, and setting a first duty ratio and a second duty ratio according to the mode;
   detecting an inductor current and generating a current feedback signal, and setting a regulation component according to the current feedback signal; and
   regulating the first duty ratio or the second duty ratio according to the regulation component and generating driving signals to control the two groups of switches;
   wherein the control method further comprises: setting the first threshold according to a preset switching frequency and a dead time; and setting a second threshold according to half of the preset switching frequency and the dead time.

2. The control method according to claim 1, wherein the setting a regulation component according to the current feedback signal comprises:
   comparing the current feedback signal with a current reference to generate a current error; and
   generating the regulation component corresponding to the current error through a current regulator.

3. The control method according to claim 1, wherein the determining an operating mode of the DC/DC converter according to a first threshold and the voltage gain, comprises:
   controlling the DC/DC converter to operate in a first mode if the voltage gain is less than the first threshold;
   controlling the DC/DC converter to operate in a second mode, if the voltage gain is equal to or greater than the first threshold, and the voltage gain is less than 1;
   controlling the DC/DC converter to operate in a third mode, if the voltage gain is equal to 1 or greater than 1, and the voltage gain is less than a reciprocal of the first threshold;

controlling the DC/DC converter to operate in a fourth mode if the voltage gain is greater than or equal to the reciprocal of the first threshold.

4. The control method according to claim 3, wherein,
in the first mode, the first duty ratio is set to be the voltage gain, and the second duty ratio is set to 1;
in the fourth mode, the first duty ratio is set to 1, and the second duty ratio is set to be a reciprocal of the voltage gain.

5. The control method according to claim 3, wherein,
in the second mode, the first duty ratio is set to be a product of the voltage gain and the second threshold, and the second duty ratio is set to be the second threshold.

6. The control method according to claim 3, wherein,
in the third mode, the first duty ratio is set to be the second threshold, and the second duty ratio is set to be a ratio of the second threshold to the voltage gain.

7. The control method according to claim 3, wherein the first group of switches comprises a first switch and a third switch that are connected in series between the positive terminal and the negative terminal of the input capacitor; and the second group of switches includes a second switch and a fourth switch that are connected in series between the positive terminal and the negative terminal of the output capacitor; wherein the method further comprises:
generating a first driving signal to control the first switch, and generating a third driving signal complementary to the first driving signal to control the third switch, according to the regulated first duty ratio;
generating a second driving signal to control the second switch, and generating a fourth driving signal complementary to the second driving signal to control the fourth switch, according to the regulated second duty ratio.

8. The control method according to claim 7, further comprising:
in the second mode and the third mode, the first driving signal and the second driving signal are in phase.

9. The control method according to claim 3, wherein,
a switching frequency in the second mode or in the third mode is half of a switching frequency in the first mode or in the fourth mode.

10. The control method according to claim 3, wherein the first group of switches comprises a first switch, a third switch, a fifth switch and a seventh switch that are connected in series between the positive terminal and the negative terminal of the input capacitor; and the second group of switches comprises a second switch, a fourth switch, a sixth switch and an eighth switch that are connected in series between the positive terminal and the negative terminal of the output capacitor; wherein the control method further comprises:
generating driving signals according to the regulated first duty ratio to control the first group of switches, wherein a first driving signal of the first switch and a seventh driving signal of the seventh switch are complementary, and a third driving signal of the third switch and a fifth driving signal of the fifth switch are complementary;
generating driving signals according to the regulated second duty ratio to control the second group of switches, wherein a second driving signal of the second switch and an eighth driving signal of the eighth switch are complementary, and a fourth driving signal of the fourth switch and a sixth driving signal of the sixth switch are complementary;
wherein duty ratios of the first driving signal and the third driving signal are same, and the first driving signal and the third driving signal are 180° out of phase; duty ratios of the second driving signal and the fourth driving signal are same, and the second driving signal and the fourth driving signal are 180° out of phase.

11. The control method according to claim 10, wherein in the second mode and the third mode, the first driving signal and the second driving signal are in phase or 180° out of phase.

12. A DC/DC converter for converting an input voltage into an output voltage, comprising:
an input capacitor and an output capacitor configured to provide the input voltage and the output voltage respectively;
two groups of switches, wherein a first group of switches includes a first switch, a third switch, a fifth switch and a seventh switch that are connected in series from a positive terminal of the input capacitor to a negative terminal of the input capacitor, and a second group of switches includes a second switch, a fourth switch, a sixth switch and an eighth switch that are connected in series from a positive terminal of the output capacitor to a negative terminal of the output capacitor;
an inductor, wherein one end of the inductor is coupled to a midpoint between the third switch and the fifth switch of the first group of switches, and the other end thereof is coupled to a midpoint between the fourth switch and the sixth switch of the second group of switches;
two flying capacitors, wherein a first flying capacitor is coupled between a connection point of the first switch and the third switch and a connection point of the fifth switch and the seventh switch, and a second flying capacitor is coupled between a connection point of the second switch and the fourth switch and a connection point of the sixth switch and the eighth switch;
a controller, configured to sample the input voltage and the output voltage, calculate a voltage gain according to a ratio of the output voltage to the input voltage, determine an operating mode of the DC/DC converter according to a first threshold and the voltage gain, and set a first duty ratio and a second duty ratio according to the mode; and configured to sample an inductor current to generate a current feedback signal, set a regulation component according to the current feedback signal, regulate the first duty ratio or the second duty ratio according to the regulation component and generate driving signals to control the two groups of switches;
wherein the controller further comprises a presetting unit, configured to: set the first threshold according to a preset switching frequency and a dead time; and set a second threshold according to half of the preset switching frequency and the dead time.

13. The DC/DC converter according to claim 12, wherein the controller further comprises a current regulating unit, and the current regulating unit is configured to compare the current feedback signal with a current reference to generate a current error; and set the regulation component corresponding to the current error through a current regulator.

14. The DC/DC converter according to claim 12, wherein the controller further comprises a voltage regulating unit, and the voltage regulating unit is configured to determine the operating mode of the DC/DC converter according to the preset first threshold and the voltage gain, wherein, the voltage regulating unit is configured to control the DC/DC converter to operate in a first mode if the voltage gain is less than the first threshold;

the voltage regulating unit is configured to control the DC/DC converter to operate in a second mode, if the voltage gain is equal to or greater than the first threshold, and the voltage gain is less than 1;

the voltage regulating unit is configured to control the DC/DC converter to operate in a third mode, if the voltage gain is equal to or greater than 1, and the voltage gain is less than a reciprocal of the first threshold;

the voltage regulating unit is configured to control the DC/DC converter to operate in a fourth mode if the voltage gain is greater than or equal to the reciprocal of the first threshold.

15. The DC/DC converter according to claim 14, wherein, in the first mode, the voltage regulating unit is configured to set the first duty ratio to be the voltage gain, and set the second duty ratio to 1;

in the second mode, the voltage regulating unit is configured to set the first duty ratio to be a product of the voltage gain and the second threshold, and set the second duty ratio to the second threshold;

in the third mode, the voltage regulating unit is configured to set the first duty ratio to be the second threshold, and set the second duty ratio to be a ratio of the second threshold to the voltage gain;

in the fourth mode, the voltage regulating unit is configured to set the first duty ratio to 1, and set the second duty to be a reciprocal of the voltage gain.

16. The DC/DC converter according to claim 14, wherein the controller further comprises a main calculating unit, wherein, the main calculating unit is configured to generate driving signals according to the regulated first duty ratio to control the first switch, the third switch, the fifth switch and the seventh switch respectively; wherein, a first driving signal of the first switch and a seventh driving signal of the seventh switch are complementary, a third driving signal of the third switch and a fifth driving signal of the fifth switch are complementary, the duty ratios of the first driving signal and the third driving signal are same, and the first driving signal and the third driving signal are 180° out of phase;

the main calculating unit is configured to generate driving signals according to the regulated second duty ratio to control the second switch, the fourth switch, the sixth switch and the eighth switch respectively; wherein, a second driving signal of the second switch and an eighth driving signal of the eighth switch are complementary, a fourth driving signal of the fourth switch and a sixth driving signal of the sixth switch are complementary, and the duty ratios of the second driving signal and the fourth driving signal are same, and the second driving signal and the fourth driving signal are 180° out of phase.

17. The DC/DC converter according to claim 16, wherein, in the second mode and the third mode, the first driving signal and the second driving signal are in phase or 180° out of phase.

18. The DC/DC converter according to claim 16, wherein, a switching frequency in the second mode or in the third mode is half of a switching frequency in the first mode or in the fourth mode.

* * * * *